(12) United States Patent
Isono (10) Patent No.: US 8,499,583 B2
(45) Date of Patent: Aug. 6, 2013

(54) METHOD OF MANUFACTURING MAGNETIC-DISK GLASS SUBSTRATE AND METHOD OF MANUFACTURING MAGNETIC DISK

(75) Inventor: Hideki Isono, Tokyo (JP)

(73) Assignee: Hoya Corporation, Tokyo (JP)

( * ) Notice: Subject to any disclaimer, the term of this patent is extended or adjusted under 35 U.S.C. 154(b) by 1310 days.

(21) Appl. No.: 11/910,410

(22) PCT Filed: Mar. 27, 2006

(86) PCT No.: PCT/JP2006/306147
§ 371 (c)(1),
(2), (4) Date: Oct. 1, 2007

(87) PCT Pub. No.: WO2006/106627
PCT Pub. Date: Oct. 12, 2006

(65) Prior Publication Data
US 2009/0142484 A1 Jun. 4, 2009

(30) Foreign Application Priority Data

Mar. 31, 2005 (JP) ................................ 2005-102423
Mar. 31, 2005 (JP) ................................ 2005-102424

(51) Int. Cl.
| C03C 15/00 | (2006.01) |
| C03C 17/00 | (2006.01) |
| G11B 5/00 | (2006.01) |

(52) U.S. Cl.
USPC ........................... 65/30.14; 65/60.7; 427/127

(58) Field of Classification Search
USPC ............................................... 65/30.14, 60.7
See application file for complete search history.

(56) References Cited

U.S. PATENT DOCUMENTS

| 3,484,224 A | * | 12/1969 | Ray et al. ..................... 65/30.14 |
| 3,765,855 A | * | 10/1973 | Larrick ......................... 65/30.14 |
| 3,773,487 A | * | 11/1973 | Plumat et al. ................. 65/30.14 |

(Continued)

FOREIGN PATENT DOCUMENTS

| JP | 7-223844 A | 8/1995 |
| JP | 11328601 A | 11/1999 |

(Continued)

OTHER PUBLICATIONS

Borrelli et al. "Glass strengthening with an ultrafast laser" Laser Microprocessing Conf., ICALEO, Paper M404, Corning Inc., p. 185-189.*
Japanese Office Action corresponding to Japanese Patent Application No. 2005-102424, mailed Aug. 16, 2011.

*Primary Examiner* — Timothy Meeks
*Assistant Examiner* — Mandy Louie
(74) *Attorney, Agent, or Firm* — Sughrue Mion, PLLC (57) ABSTRACT

A process for producing a glass substrate for magnetic disk through chemical strengthening operation, in which the distribution of compressive stress is uniformed at a surface layer portion of the glass substrate to thereby, while preventing failures such as head crash and thermal asperity, realize a low flying height of magnetic head, attaining high-density information recording. In particular, the provided glass substrate for magnetic disk is suitable for application to compact magnetic disks for portable information equipment. The chemical strengthening operation includes the first step of bringing the glass substrate into contact with a first treatment solution (chemical strengthening treatment solution) containing first ions with an ionic radius larger than those of ions within the glass substrate and either the second and subsequent steps of bringing the platy glass into contact with treatment solutions containing second and subsequent bivalent ions, or the second and subsequent steps of bringing the glass substrate into contact with second and subsequent chemical strengthening treatment solutions containing second and subsequent ions exhibiting an ion exchange rate with ions within the glass substrate greater than that of the first ions to thereby decelerate the ion exchange.

11 Claims, 3 Drawing Sheets

(56) References Cited

U.S. PATENT DOCUMENTS

| | | | |
|---|---|---|---|
| 4,671,814 A * | 6/1987 | Aratani et al. | 65/30.14 |
| 5,997,977 A * | 12/1999 | Zou et al. | 428/64.1 |
| 6,376,402 B1 * | 4/2002 | Pannhorst et al. | 501/66 |
| 6,516,634 B1 * | 2/2003 | Green et al. | 65/30.14 |
| 2002/0055017 A1 * | 5/2002 | Fukushima et al. | 428/694 SG |
| 2004/0163414 A1 * | 8/2004 | Eto et al. | 65/30.14 |

FOREIGN PATENT DOCUMENTS

| | | | |
|---|---|---|---|
| JP | 2002-121051 A | | 4/2002 |
| JP | 2002220259 | * | 9/2002 |
| JP | 2004-303281 A | | 10/2004 |
| JP | 2005-149668 A | | 6/2005 |
| JP | 2005-174500 A | | 6/2005 |

* cited by examiner

METHOD OF MANUFACTURING MAGNETIC-DISK GLASS SUBSTRATE AND METHOD OF MANUFACTURING MAGNETIC DISK

TECHNICAL FIELD

This invention relates to a method of manufacturing a magnetic-disk glass substrate adapted to form a magnetic disk for use in a hard disk drive (HDD) or the like, which is a magnetic disk device, and a method of manufacturing a magnetic disk using such a magnetic-disk glass substrate.

BACKGROUND ART

These days, following the development of the so-called IT industry, remarkable technological innovation has been required in the information recording technology, particularly in the magnetic recording technology. In magnetic disks to be mounted in hard disk drives (HDDs) being magnetic disk devices for use as computer storages or the like, differing from other magnetic recording media such as magnetic tapes or flexible disks, information recording density has been increased rapidly. Supported by this increase in information recording density of the magnetic disks, the information recording capacity of hard disk drives that can be accommodated in personal computer apparatuses has increased remarkably.

Such a magnetic disk is constituted by forming a magnetic layer and so forth on a substrate such as an aluminum-based alloy substrate or a glass substrate. In the hard disk drive, using a magnetic head flying over the magnetic disk rotating at a high speed, information signals are recorded on the magnetic layer as magnetization patterns or reproduced.

In recent years, in such magnetic disks, the information recording density has exceeded 40 gigabits per inch$^2$ and, further, an ultra-high recording density exceeding even 100 gigabits per inch$^2$ is being realized. The recent magnetic disks capable of realizing such a high information recording density have a feature in that, even with a much smaller disk area as compared with those of conventional magnetic disks such as flexible disks, it can store a practically sufficient information amount.

Further, such magnetic disks also have a feature in that, as compared with other information recording media, it is much faster in information recording and reproducing speeds (response speeds) and thus enables real-time writing and reading of information.

Attention has been paid to various features of such magnetic disks. As a result, in recent years, there have been required miniaturized hard disk drives that can be mounted in portable devices, such as so-called portable telephones, digital cameras, portable information devices (e.g. PDA (personal digital assistant)), or car navigation systems, having much smaller housings than those of personal computer apparatuses and required to have high response speeds.

Following the increase in requirement for mounting the hard disk drives in the portable devices (so-called "mobile use"), glass substrates each made of glass being a hard material have been used as magnetic-disk substrates. This is because the glass substrate has high strength and high rigidity as compared with a substrate made of metal being a soft material.

Further, in the case of the glass substrate, the smooth surface can be obtained. Therefore, it is possible to achieve a reduction in flying amount (a reduction in flying height) of a magnetic head that performs recording/reproduction while flying over a magnetic disk, while preventing failures such as head crash and thermal asperity. As consequence, it is possible to obtain a magnetic disk with high information recording density.

Figure 3:
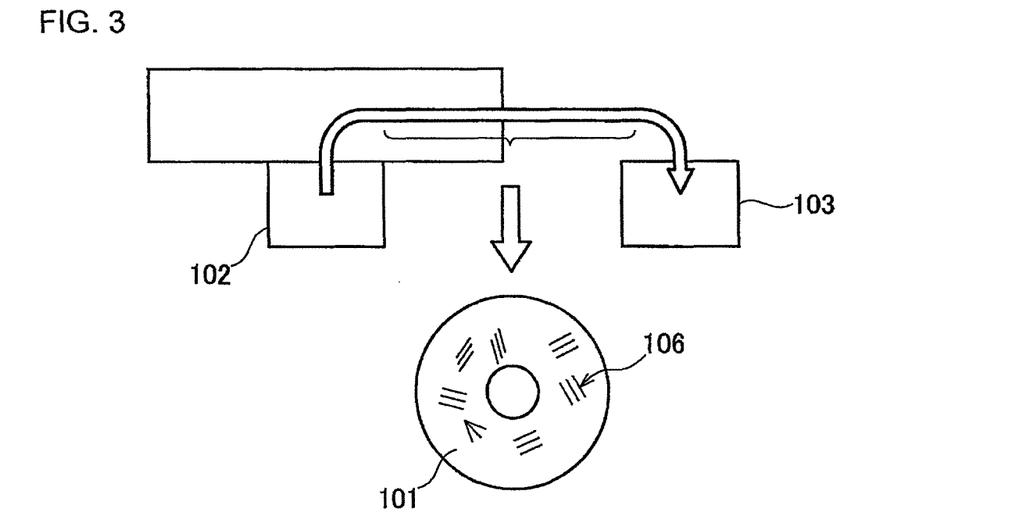
FIG. 3 is a side view showing a chemical strengthening process in a conventional magnetic-disk glass substrate manufacturing method.

However, the glass substrate also has a side of being a brittle material. In view of this, various glass substrate strengthening methods have been conventionally proposed. For example, Patent Document 1 describes a chemical strengthening process in which, as shown in FIG. 3, a glass substrate 101 is immersed for a predetermined time in a solution of a nitrate such as sodium nitrate ($NaNO_3$) or potassium nitrate ($KNO_3$) heated to about 300° C. in a chemical strengthening vessel 102 to replace lithium ions ($Li^+$) at surface layer portions of the glass substrate by sodium ions ($Na^+$) or potassium ions ($K^+$), or replace sodium ions ($Na^+$) at surface layer portions of the glass substrate by potassium ions ($K^+$), thereby forming compressive stress layers at the surface layer portions on both sides so that a tensile stress layer is formed between the compressive stress layers.

On the other hand, Patent Document 2 describes a method of preventing so-called "weathering" that occurs after a chemical strengthening process.

This "weathering" is generally a phenomenon in which when water adheres to the surface of a chemically strengthened glass substrate and carbon dioxide in the air is mixed into this water to form carbonic acid ($H_2CO_3$), sodium ions ($Na^+$) in the glass substrate and the carbonic acid react to form sodium carbonate, sodium bicarbonate, potassium carbonate, or the like, so that convex portions are formed on the surface.

Patent Document 2 describes that a glass substrate is immersed in a solution of a molten salt consisting of only potassium nitrate ($KNO_3$) and then immersed in a solution of a mixed molten salt of sodium nitrate ($NaNO_3$) and potassium nitrate ($KNO_3$), thereby suppressing alkaline elution to the glass surface to obtain the glass substrate having high chemical durability.

Patent Document 1: Japanese Unexamined Patent Application Publication (JP-A) No. 2002-121051

Patent Document 2: Japanese Unexamined Patent Application Publication (JP-A) No. Hei 7-223844

DISCLOSURE OF THE INVENTION

Problem to be Solved by the Invention

In the foregoing chemical strengthening process, however, there are those instances where while the glass substrate 101 is transferred from the chemical strengthening vessel 102 to a cleaning bath 103 after the glass substrate is immersed in the chemical strengthening vessel 102 for the chemical strengthening over the predetermined time and is then removed therefrom, the chemical strengthening is carried out excessively due to adhesion of a chemical strengthening treatment solution to the surface of the glass substrate 101.

Figure 4:
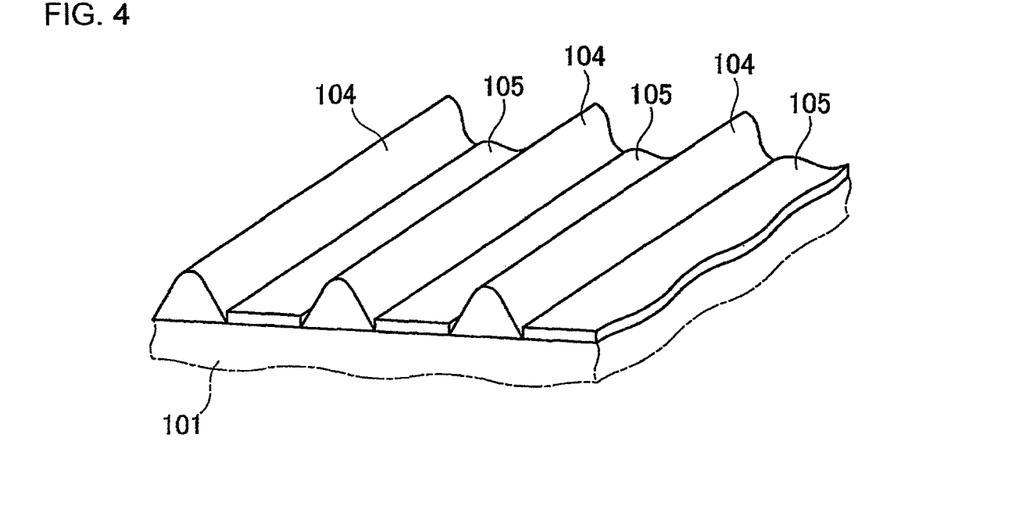
FIG. 4 is a perspective view showing a state of a surface portion of a glass substrate after finishing the chemical strengthening process in the conventional magnetic-disk glass substrate manufacturing method.

In this event, as shown in FIG. 4, the chemical strengthening treatment solution adhering to the surface of the glass substrate 101 is subjected to occurrence of so-called "liquid drip" on the surface of the glass substrate 101, thereby forming solid portions 104 solidified due to rapid cooling and portions 105 flowing still in the liquid form. Consequently, the excessive chemical strengthening as described above is not carried out over the entire surface of the glass substrate 101, but is carried out, as shown in FIG. 3, at striped portions 106 according to the flow of the chemical strengthening treatment solution.

Figure 5:
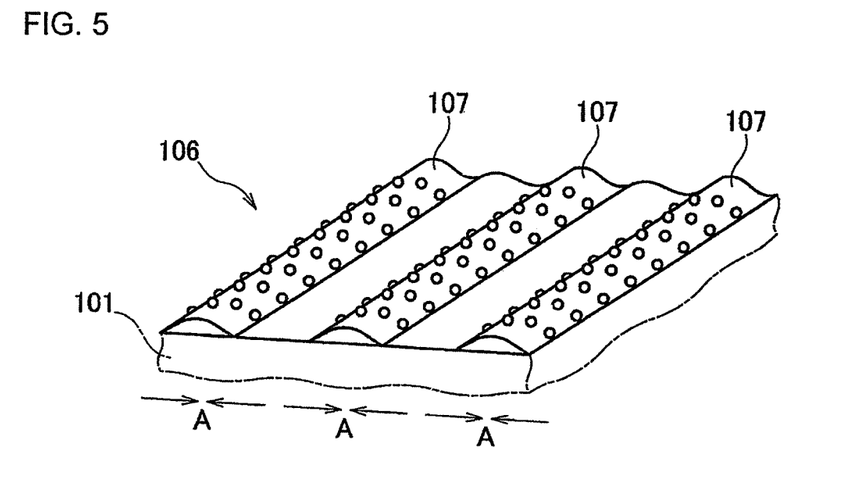
FIG. 5 is a perspective view explaining a phenomenon that occurs after finishing the chemical strengthening process in the conventional magnetic-disk glass substrate manufacturing method.

Then, at the surface layer portion of the glass substrate 101, as shown in FIG. 5, the compressive stress increases as indicated by arrows A only at the striped portions 106 which have been subjected to the excessive chemical strengthening. Thereby, distribution of the compressive stress becomes ununiform. As a result, surface portions of the striped portions 106 which have been subjected to the excessive chemical strengthening bulge out so that a plurality of convex portions (fine waviness) 107 having a height of about 2 nm to 5 nm are formed.

If such convex portions (fine waviness) 107 are formed at the surface portion of the glass substrate 101, there is a possibility of occurrence of failures such as head crash due to influence on the flying height of a magnetic head in connection with a magnetic disk formed by such a glass substrate 101. So far, the convex portions (fine waviness) of this level did not become a problem. However, because of the reduction in flying height, the convex portions (fine waviness) of this level is becoming a problem.

Therefore, this invention has been made in view of the foregoing circumstances and has an object to provide a magnetic-disk glass substrate manufacturing method having a chemical strengthening process of forming compressive stress layers at surface layer portions on both main surface sides of a glass substrate by chemical strengthening treatment and thus forming a tensile stress layer between the compressive stress layers, the magnetic-disk glass substrate manufacturing method capable of manufacturing a magnetic-disk glass substrate that can constitute a magnetic disk having a uniform distribution of compressive stress at the surface layer portions of the glass substrate so as to achieve a reduction in flying height of a magnetic head while preventing failures such as head crash and thermal asperity to thereby enable high density information recording, the magnetic disk particularly suitable for use in a small-sized hard disk drive for a portable information device.

Further, this invention has an object to provide a magnetic disk manufacturing method capable of manufacturing, using such a magnetic-disk glass substrate, a magnetic disk that can achieve a reduction in flying height of a magnetic head while preventing failures such as head crash and thermal asperity to thereby enable high density information recording, the magnetic disk particularly suitable for use in a small-sized hard disk drive for a portable information device.

Means for Solving the Problem

As a result of pursuing the study to solve the foregoing problem, the present inventor has found that the foregoing problem can be solved by properly setting and controlling a condition of a chemical strengthening treatment solution in the chemical strengthening process.

That is, this invention has one of the following structures.

(Structure 1)
According to this invention, a method of manufacturing a magnetic-disk glass substrate, the method including a chemical strengthening process of chemically strengthening the glass substrate, wherein:
the chemical strengthening process comprises at least two steps;
a first step brings the glass substrate into contact with a chemical strengthening treatment solution containing first ions having an ionic radius larger than an ionic radius of ions contained in the glass substrate, thereby causing ion exchange to occur; and
a second or subsequent step brings the glass substrate into contact with a treatment solution containing second or subsequent ions being bivalent ions.

(Structure 2)
According to this invention, the method of manufacturing the magnetic-disk glass substrate according to the structure 1, wherein:
the second or subsequent ions are any one of $Pb^{2+}$, $Cd^{2+}$, $Zn^{2+}$, $Hg^{2+}$, $Ca^{2+}$, $Sr^{2+}$ and $Ba^{2+}$.

(Structure 3)
According to this invention, a method of manufacturing a magnetic-disk glass substrate, the method including a chemical strengthening process of chemically strengthening the glass substrate, wherein:
the chemical strengthening process comprises at least two steps;
the first step of bringing the glass substrate into contact with a chemical strengthening treatment solution brings the glass substrate into contact with the chemical strengthening treatment solution containing first ions having an ionic radius larger than an ionic radius of alkali metal ions contained in the glass substrate, thereby causing ion exchange to occur; and
the second or subsequent step brings the glass substrate into contact with a treatment solution containing second or subsequent ions having an ionic radius smaller than the ionic radius of the first ions.

(Structure 4)
A method of manufacturing of a magnetic-disk glass substrate, the method including a chemical strengthening process of chemically strengthening the glass substrate, wherein:
the chemical strengthening process comprises at least two steps;
the first step of bringing the glass substrate into contact with a chemical strengthening treatment solution brings the glass substrate into contact with the chemical strengthening treatment solution containing first ions having an ionic radius larger than an ionic radius of ions contained in the glass substrate, thereby causing ion exchange to occur; and
the second or subsequent step brings the glass substrate into contact with a treatment solution containing second or subsequent ions having an ionic radius equal to an ionic radius of smallest alkali metal ions in alkali metal ions contained in the glass substrate.

(Structure 5)
According to this invention, the method of manufacturing the magnetic-disk glass substrate according to the structure 3 or the structure 4, wherein:
the second or subsequent ions are present in the chemical strengthening treatment solution in the first step; and
a ratio of the second or subsequent ions in the treatment solution in the second or subsequent step is higher than a ratio of the second or subsequent ions in the chemical strengthening treatment solution in the first step.

(Structure 6)
According to this invention, the method of manufacturing of the magnetic-disk glass substrate according to any one of the structures 3 to 5, wherein:
the second or subsequent ions are lithium ions or sodium ions.

(Structure 7)
According to this invention, the method of manufacturing of the magnetic-disk glass substrate according to any one of the structures 3 to 6, wherein:
a time for which the glass substrate is in contact with the chemical strengthening treatment solution in the first step is longer than a time for which the glass substrate is in contact with the treatment solution in the second or subsequent step.

(Structure 8)
According to this invention, the method of manufacturing of the magnetic-disk glass substrate according to any one of the structures 1 to 2, wherein:

a maximum value of fine waviness of a main surface of the glass substrate is less than 5 nm in a rectangular measurement range having sides of 800 μm and 980 μm.

(Structure 9)

According to this invention, a method of manufacturing a magnetic-disk glass substrate containing an alkali metal element, the method including a step of treating a surface of the glass substrate, comprising:

ion-exchanging alkali metal ions contained in the glass substrate for alkali metal ions having an ionic radius relatively larger than an ionic radius of the alkali metal ions contained in the glass substrate, thereby chemically strengthening the surface of the glass substrate; and thereafter bringing the surface of the glass substrate into contact with alkali metal ions equal to or relatively smaller than a smallest alkali metal ions contained in the glass substrate.

(Structure 10)

According to this invention, a method of manufacturing a magnetic-disk glass substrate containing an alkali metal element, the method including a step of treating a surface of the glass substrate, comprising:

bringing the surface of the glass substrate into contact with a first molten salt containing alkali metal ions having an ionic radius relatively larger an ionic radius of alkali metal ions contained in the glass substrate, thereby chemically strengthening the surface of the glass substrate;

thereafter adhering, to the surface of the glass substrate, a second molten salt containing, as a main component, alkali metal ions equal to or relatively smaller than smallest alkali metal ions contained in the glass substrate, and cooling the glass substrate on which the second molten is adhered.

(Structure 11)

According to this invention, the method of manufacturing the magnetic-disk glass substrate according to the structure 10, comprising:

cooling the glass substrate to a temperature equal to or less than a freezing point of the second molten salt in an atmosphere.

(Structure 12)

A method of manufacturing a magnetic disk according to this invention, comprising:

forming at least a magnetic layer on the magnetic-disk glass substrate manufactured by the magnetic-disk glass substrate manufacturing method according to any one of the structures 1 to 8.

Effect of the Invention

In a magnetic-disk glass substrate manufacturing method according to this invention, a first step, in a chemical strengthening process, of bringing a glass substrate into contact with a chemical strengthening treatment solution brings the glass substrate into contact with the chemical strengthening treatment solution containing first ions having an ionic radius larger than that of ions contained in the glass substrate, thereby causing ion exchange to occur, and a second or subsequent step brings the glass substrate into contact with a treatment solution containing second or subsequent ions being bivalent ions. Therefore, in the second or subsequent step, excessive chemical strengthening due to the chemical strengthening treatment solution adhering to a surface portion of the glass substrate is suppressed, resulting in no formation of convex portions (fine waviness). In this manner, the flying of a magnetic head is stabilized.

It is preferable that the second or subsequent ions be one of $Pb^{2+}$, $Cd^{2+}$, $Zn^{2+}$, $Hg^{2+}$, $Ca^{2+}$, $Sr^{2+}$, and $Ba^{2+}$.

In a magnetic-disk glass substrate manufacturing method according to this invention, a chemical strengthening process comprises at least two steps, the first step brings a glass substrate into contact with a chemical strengthening treatment solution containing first ions having an ionic radius larger than that of alkali metal ions contained in the glass substrate, thereby causing ion exchange to occur, and the second or subsequent step brings the glass substrate into contact with a treatment solution containing second or subsequent ions having an ionic radius smaller than that of the first ions. Therefore, convex portions (fine waviness) are not formed, so that the flying of a magnetic head is stabilized.

In a magnetic-disk glass substrate manufacturing method according to this invention, a chemical strengthening process comprises at least two steps, the first step brings a glass substrate into contact with a chemical strengthening treatment solution containing first ions having an ionic radius larger than that of ions contained in the glass substrate, thereby causing ion exchange to occur, and the second or subsequent step brings the glass substrate into contact with a treatment solution containing second or subsequent ions having an ionic radius equal to that of the smallest alkali metal ions in alkali metal ions contained in the glass substrate. Therefore, convex portions (fine waviness) are not formed, so that the flying of a magnetic head is stabilized.

In this invention, the second or subsequent ions may also be present in the chemical strengthening treatment solution in the first step. In this case, the ratio of the second or subsequent ions in the treatment solution in the second or subsequent step is set to be higher than that of the second or subsequent ions in the chemical strengthening treatment solution in the first step. The first step and the second or subsequent step as described above can be easily carried out by using at least two treatment vessels in which the glass substrate is immersed into the chemical strengthening treatment solution and the treatment solution, respectively.

It is preferable that the second or subsequent ions be lithium ions or sodium ions.

Further, it is preferable that a time for which the glass substrate is in contact with the chemical strengthening treatment solution in the first step be longer than that for which the glass substrate is in contact with the treatment solution in the second or subsequent step.

It is preferable that the maximum value of fine waviness of the main surface of the glass substrate be less than 5 nm in a rectangular measurement range having sides of 800 μm and 980 μm.

In a magnetic-disk glass substrate manufacturing method according to this invention, alkali metal ions contained in a glass substrate are ion-exchanged for alkali metal ions having an ionic radius relatively larger than that of the alkali metal ions contained in the glass substrate, thereby chemically strengthening the surface of the glass substrate, and then the surface of the glass substrate is brought into contact with alkali metal ions equal to or relatively smaller than the smallest alkali metal ions contained in the glass substrate. Therefore, excessive chemical strengthening is suppressed.

It is preferable to adhere, to the surface of the glass substrate, a molten salt containing, as a main component, the alkali metal ions equal to or relatively smaller than the smallest alkali metal ions contained in the glass substrate and to cool the glass substrate with the molten salt adhering thereto to a temperature equal to or less than a freezing point of the molten salt in an atmosphere. By this cooling treatment, excessive chemical strengthening is effectively suppressed.

Therefore, according to this invention, it is possible to provide a magnetic-disk glass substrate manufacturing method having a chemical strengthening process, the magnetic-disk glass substrate manufacturing method capable of manufacturing a magnetic-disk glass substrate that can constitute a magnetic disk capable of achieving a reduction in flying height of a magnetic head while preventing failures such as head crash and thermal asperity to thereby enable high density information recording, the magnetic disk particularly suitable for use in a small-sized hard disk drive for a portable information device.

Further, in a magnetic disk manufacturing method according to this invention, since use is made of the magnetic-disk glass substrate manufactured by the magnetic-disk glass substrate manufacturing method according to this invention, it is possible to manufacture a magnetic disk that can achieve a reduction in flying height of a magnetic head while preventing failures such as head crash and thermal asperity to thereby enable high density information recording, the magnetic disk particularly suitable for use in a small-sized hard disk drive for a portable information device.

DESCRIPTION OF SYMBOLS 1 plate-like glass
2 glass base member
3 glass substrate
4 first treatment vessel (chemical strengthening vessel)
5 second treatment vessel

BEST MODE FOR CARRYING OUT THE INVENTION

Hereinbelow, the best mode for carrying out this invention will be described in detail with reference to the drawings.

Figure 1:
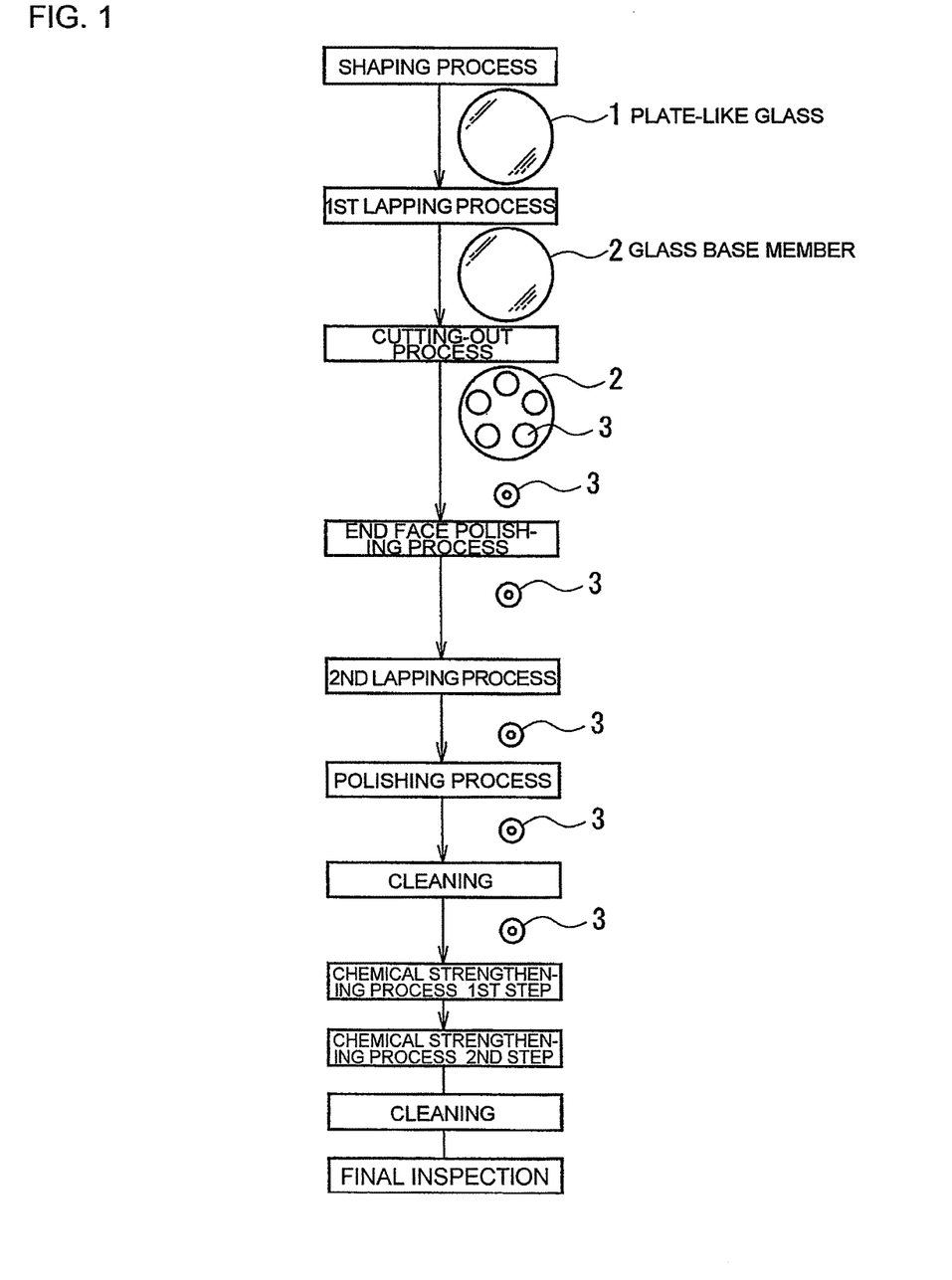
FIG. 1 is a flowchart showing processes of a magnetic-disk glass substrate manufacturing method according to this invention.

FIG. 1 is a flowchart showing processes of a magnetic-disk glass substrate manufacturing method according to this invention.

[Lapping Process]

In the magnetic-disk glass substrate manufacturing method according to this invention, at first, as shown in FIG. 1, a lapping (grinding) treatment is applied to the main surfaces of a plate-like glass 1 to obtain a glass base member 2, a glass substrate 3 is cut out from the glass base member 2, and at least a polishing (abrasion) treatment is applied to the main surfaces of the glass substrate 3.

As the plate-like glass 1 subjected to the lapping treatment, use can be made of one of plate-like glasses 1 having various shapes. The plate-like glass 1 may have a rectangular shape or a disk shape (discoid shape). The disk-shaped plate-like glass 1 can be lapped using a lapping machine used in the manufacture of conventional magnetic-disk glass substrates. In this manner, reliable processing can be carried out at low cost.

The size of the plate-like glass 1 is required to be larger than that of a magnetic-disk glass substrate to be manufactured. For example, in the case of manufacturing a magnetic-disk glass substrate to be used for a magnetic disk adapted to be mounted in a "1-inch hard disk drive" or in a small-sized hard disk drive having a size smaller than that, since the diameter of such a magnetic-disk glass substrate is about 20 mm to 30 mm, the diameter of the disk-shaped plate-like glass 1 is preferably 30 mm or more and more preferably 48 mm or more. If use is made of the disk-shaped plate-like glass 1 having a diameter of 65 mm or more, a plurality of magnetic-disk glass substrates to be used for magnetic disks each adapted to be mounted in a "1-inch hard disk drive" can be obtained from the single plate-like glass 1. This is suitable for mass production.

The plate-like glass 1 can be manufactured, for example, using a molten glass as a material, by a known manufacturing method such as a press method, a float method, or a fusion method. If the press method is used among them, the plate-like glass 1 can be manufactured at low cost.

As a material of the plate-like glass 1, no particular limitation is provided as long as it is a glass that can be chemically strengthened, but an aluminosilicate glass can be preferably used. Particularly, an aluminosilicate glass containing lithium is preferable. Such an aluminosilicate glass can precisely obtain compressive stress layers each having a preferable compressive stress and a tensile stress layer having a tensile stress by an ion-exchange chemical strengthening treatment, particularly a low-temperature ion-exchange chemical strengthening treatment. Therefore, it is preferable as a material of a chemically strengthened glass substrate 3 for a magnetic disk.

Such an aluminosilicate glass preferably contains, as main components, 58 to 75 wt % $SiO_2$, 5 to 23 wt % $Al_2O_3$, 3 to 10 wt % $Li_2O$, and 4 to 13 wt % $Na_2O$ in composition ratio.

Further, it is preferable that such an aluminosilicate glass contain, as main components, 62 to 75 wt % $SiO_2$, 5 to 15 wt % $Al_2O_3$, 4 to 10 wt % $Li_2O$, 4 to 12 wt % $Na_2O$, and 5.5 to 15 wt % $ZnO_2$ in composition ratio, wherein the weight ratio of $Na_2O$ and $ZnO_2$ ($Na_2O/ZnO_2$) is 0.5 to 2.0 and the weight ratio of $Al_2O_3$ and $ZnO_2$ ($Al_2O_3/ZnO_2$) is 0.4 to 2.5.

The lapping treatment (first lapping process) is processing for the purpose of improving the shape accuracy (e.g. flatness) and the size accuracy (e.g. plate thickness accuracy) of the main surfaces of the plate-like glass 1. This lapping treatment is carried out by pressing grindstones or surface plates onto the main surfaces of the plate-like glass 1 and relatively moving the plate-like glass 1 and the grindstones or surface plates to each other, thereby grinding the main surfaces of the plate-like glass 1. Such a lapping treatment can be carried out using a double-side lapping machine using a planetary gear mechanism.

As grindstones for use in the lapping treatment, diamond grindstones can be used. As free abrasive grains, use is preferably made of hard abrasive grains such as alumina abrasive grains, zirconia abrasive grains, or silicon carbide abrasive grains.

By this lapping treatment, the shape accuracy of the plate-like glass 1 is improved so that there is formed the glass base member 2 in which the shape of the main surfaces is flattened and the plate thickness is reduced to a predetermined value. Since the main surfaces of the glass base member 2 are flattened by the lapping treatment and the plate thickness is reduced. Therefore, it is possible to cut the glass base member 2 so as to cut out the glass substrate 3 from the glass base member 2. Specifically, when cutting out the glass substrate 3 from the glass base member 2, it is possible to prevent occurrence of a defect such as chipping, cracking, or fracturing.

[End Face Polishing Process]

It is preferable that an end face of the glass substrate 3 be subjected to mirror polishing (end face polishing process). This is because, since the end face of the glass substrate 3 has a cut shape, it is possible to suppress generation of particles from the end face by polishing the end face to a mirror surface and, thus, in a magnetic disk manufactured using this magnetic-disk glass substrate, the so-called thermal asperity failure can be satisfactorily prevented. Further, if the end face is the mirror surface, delayed fracture due to fine cracks can be prevented. As a mirror surface state of the end face, a mirror surface with 100 nm or less in arithmetic average roughness (Ra) is preferable.

[Second Lapping Process]

It is preferable to carry out a lapping treatment (second lapping process) before a later-described polishing process of the glass substrate 3. The lapping treatment at this time can be carried out by the same means as that of the foregoing lapping treatment for the plate-like glass 1. By carrying out the polishing treatment after applying the lapping treatment to the glass substrate 3, the mirror-finished main surfaces can be obtained in a shorter time.

[Polishing Process]

The polishing treatment is applied to the glass substrate 3 cut out from the glass base member 2, thereby mirror-finishing the main surfaces of the glass substrate 3.

By applying this polishing treatment, cracks of the main surfaces of the glass substrate 3 are removed, so that fine waviness of the main surfaces is reduced, for example, to a maximum value of 5 nm or less. This maximum value of the fine waviness is a maximum value when measuring waviness of frequencies with wavelengths of 4 μm to 1 mm by a non-contact laser interference method using "MicroXAM" manufactured by Phase Shift Technology, Inc. The measurement range is within a rectangle (800 μm×980 μm) having sides of 800 μm and 980 μm.

If the main surfaces of the glass substrate 3 are finished to such mirror surfaces, even when the flying height of a magnetic head is, for example, 10 nm, it is possible to prevent occurrence of the so-called crash failure and thermal asperity failure in the case of a magnetic disk manufactured using this glass substrate 3. Further, if the main surfaces of the glass substrate 3 are finished to such mirror surfaces, a chemical strengthening treatment can be uniformly applied to fine regions of the glass substrate 3 in a later-described chemical strengthening process and delayed fracture due to fine cracks can be prevented.

This polishing process is carried out, for example, by pressing surface plates, with polishing cloths (e.g. polishing pads) bonded thereto, onto the main surfaces of the glass substrate 3 and relatively moving the glass substrate 3 and the surface plates to each other while supplying a polishing solution to the main surfaces of the glass substrate 3, thereby polishing the main surfaces of the glass substrate 3. In this event, it is preferable that polishing abrasive grains be contained in the polishing solution. As the polishing abrasive grains, use can be made of colloidal silica polishing abrasive grains. As the polishing abrasive grains, it is preferable to use abrasive grains having an average grain size of 10 nm to 200 nm.

As another polishing treatment, use may be made of a tape polishing method that, for example, presses tape-shaped polishing cloths (e.g. polishing tapes) onto the main surfaces of the glass substrate 3 and relatively moves the glass substrate 3 and the polishing cloths to each other while supplying a polishing solution to the main surfaces of the glass substrate 3, thereby polishing the main surfaces of the glass substrate 3. In this event, it is preferable that polishing abrasive grains be contained in the polishing solution. As the polishing abrasive grains, use can be made of diamond polishing abrasive grains. As the polishing abrasive grains, it is preferable to use abrasive grains having an average grain size of 10 nm to 200 nm.

It is preferable that polishing surfaces of the polishing pads or polishing tapes be made of a resin material such as polyurethane or polyester. It is preferable that the polishing surfaces be made of a resin foam (e.g. polyurethane foam) in the case of the polishing pads and the polishing surfaces be made of resin fibers (e.g. polyester resin fibers) in the case of the polishing tapes.

[Chemical Strengthening Process]

In the chemical strengthening process before and/or after the polishing process of the glass substrate 3, the chemical strengthening treatment is carried out. By carrying out the chemical strengthening treatment, it is possible to generate high compressive stresses on the surfaces of the magnetic-disk glass substrate and thus to improve the impact resistance. Particularly, when the aluminosilicate glass is used as the material of the glass substrate 3, the chemical strengthening treatment can be suitably carried out.

In this invention, the chemical strengthening process has at least two steps in which the glass substrate 3 is brought into contact with chemical strengthening treatment solutions, respectively. The chemical strengthening process can be carried out using at least two chemical strengthening vessels in which the glass substrate 3 is immersed into chemical strengthening treatment solutions, respectively.

(First Step)

Figure 2:
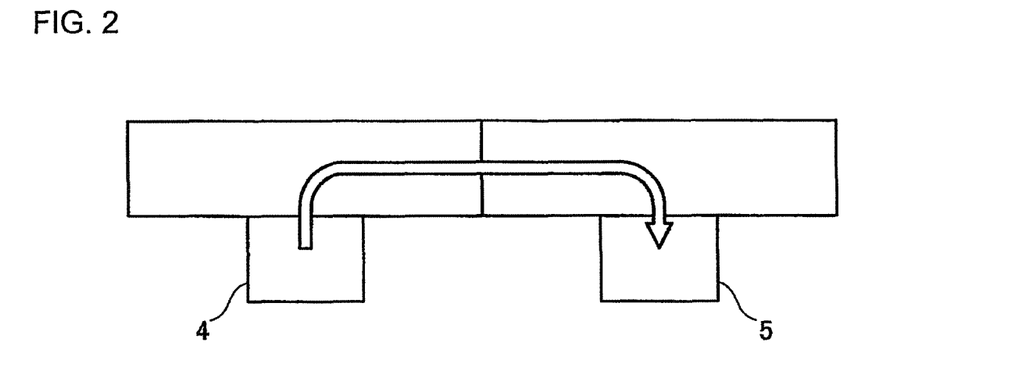
FIG. 2 is a side view showing a chemical strengthening process in the magnetic-disk glass substrate manufacturing method according to this invention.

FIG. 2 is a side view showing the chemical strengthening process in the magnetic-disk glass substrate manufacturing method according to this invention.

In a first step of first bringing the glass substrate 3 into contact with a chemical strengthening treatment solution, the glass substrate 3 is brought into contact with a first treatment solution (chemical strengthening treatment solution) containing first ions having an ionic radius larger than that of ions contained in the glass substrate 3, thereby causing ion exchange to occur. In the case where the chemical strengthening process is carried out by using at least two treatment vessels, the first step is carried out by using a first treatment vessel (chemical strengthening vessel) 4 as shown in FIG. 2. Thus, the glass substrate 33 is immersed into the first treatment solution (chemical strengthening treatment solution) containing the first ions having the ionic radius larger than that of the ions contained in the glass substrate 3.

The first step of the chemical strengthening process is equivalent to a process known as a chemical strengthening treatment method. In this case, a heated molten chemical strengthening salt can be used as the first treatment solution (chemical strengthening treatment solution). As ion exchange methods, there are known a low-temperature ion exchange method, a high-temperature ion exchange method, a surface crystallization method, a glass surface dealkalization method, and so on. In this first step, it is preferable to use the low-temperature ion exchange method that performs ion exchange in a temperature range not exceeding a glass annealing point.

The low-temperature ion exchange method called herein represents a method that replaces alkali metal ions in a glass by alkali metal ions having a larger ionic radius in a temperature range equal to or less than a glass annealing point and produces a compressive stress in a surface layer of the glass by an increase in volume of an ion exchange portion, thereby strengthening the surface layer of the glass.

The heating temperature of the molten salt when carrying out the chemical strengthening treatment is preferably 280° C. to 660° C., particularly 300° C. to 400° C. from a viewpoint that the ion exchange is well performed, and so on. The time for which the glass substrate 3 is in contact with the molten salt is preferably set to several hours to several tens of hours.

It is preferable that, before bringing the glass substrate 3 into contact with the molten salt, the glass substrate 3 be heated to 100° C. to 300° C. for preheating.

A material of the chemical strengthening vessel for carrying out the chemical strengthening process is not particularly limited as long as it is a material excellent in corrosion resistance and low in dust generation. Since the chemical strengthening salt and the molten chemical strengthening salt are oxidative and, further, the treatment temperature is high, it is necessary to suppress damage and generation of dust by selecting the material excellent in corrosion resistance to thereby suppress thermal asperity failure and head crash. From this view, as the material of the chemical strengthening vessel, a quartz material is particularly preferable, but a stainless material, particularly a martensitic or austenitic stainless material that is excellent in corrosion resistance, can also be used. Since the quartz material is excellent in corrosion resistance but expensive, selection can be properly made taking payability into account.

As the first treatment solution (chemical strengthening treatment solution), it is preferable to use a nitrate containing alkali metal elements, for example, a nitrate containing potassium nitrate, sodium nitrate, lithium nitrate, and so on. The lithium element contained in the nitrate is preferably set to 0 ppm to 2000 ppm. This is because such a chemical strengthening salt can realize predetermined rigidity and impact resistance as a magnetic-disk glass substrate when a glass, particularly an aluminosilicate glass containing a lithium element, is chemically strengthened. If the amount of lithium ions contained in the molten chemical strengthening salt in the first step is too large, the ion exchange is hindered. As a result, it often becomes difficult to obtain the tensile stress and the compressive stress to be obtained in this invention.

(Second and Subsequent Steps)

A second step of the chemical strengthening process, following the foregoing first step, brings the glass substrate 3 into contact with a second treatment solution. In this second step, the glass substrate is brought into contact with a second treatment solution containing second ions being bivalent ions.

The second ions may also be present in the first treatment solution (chemical strengthening treatment solution) in the first step. In this case, the ratio of the second ions in the second treatment solution in the second step is set to be higher than that of the second ions in the first treatment solution (chemical strengthening treatment solution) in the first step. Further, the time for which the glass substrate 3 is in contact with the first treatment solution (chemical strengthening treatment solution) in the first step is set to be longer than that for which the glass substrate 3 is in contact with the second treatment solution in the second step.

Alternatively, in this second step, the glass substrate 3 is brought into contact with a second treatment solution containing second ions having an ionic radius smaller than that of the first ions. The second ions may be ions having an ionic radius equal to that of the smallest alkali metal ions in alkali metal ions contained in the glass substrate 3. The ionic radius can be measured by ion chromatography.

As the second treatment solution, it is preferable to use a nitrate containing alkali metal elements, for example, a nitrate containing lithium nitrate and so on. The lithium element contained in the nitrate is preferably set to 2000 ppm or more.

The second ions may also be present in the first treatment solution (chemical strengthening treatment solution) in the first step. In this case, the ratio of the second ions in the second treatment solution in the second step is set to be higher than that of the second ions in the first treatment solution (chemical strengthening treatment solution) in the first step. The ratio of the ions with the smaller ionic radius being higher in the second treatment solution than in the first treatment solution (chemical strengthening treatment solution) and the ratio of the ions having the larger ionic radius being higher in the first treatment solution (chemical strengthening treatment solution) than in the second treatment solution as described above are measured by ion chromatography.

Further, the time for which the glass substrate 3 is in contact with the first treatment solution (chemical strengthening treatment solution) in the first step is set to be longer than that for which the glass substrate 3 is in contact with the second treatment solution in the second step.

The second step is carried out using a second treatment vessel 5. The glass substrate 3 is removed from the first treatment vessel (chemical strengthening treatment solution) 4 and immersed into the second treatment solution in the second treatment vessel 5.

In this second step, the glass substrate 3 is brought into contact with the second treatment solution containing the second ions being the bivalent ions or with the second treatment solution in which the second ions are present at the ratio higher than that of the second ions in the first treatment solution (chemical strengthening treatment solution) in the first step.

Alternatively, in this second step, the glass substrate 3 is brought into contact with the second solution containing the second ions having the ionic radius smaller than that of the first ions, with the second treatment solution containing the second ions having the ionic radius equal to that of the smallest alkali metal ions in the alkali metal ions contained in the glass substrate 3, or with the second treatment solution in which the second ions are present at the ratio higher than that of the second ions in the first treatment solution (chemical strengthening treatment solution) in the first step.

Therefore, even if the first treatment solution (chemical strengthening treatment solution) is adhering to the surface portions of the glass substrate 3 when the glass substrate 3 is removed from the first treatment vessel (chemical strengthening vessel) 4, since the glass substrates is brought into contact with the second treatment solution in the second treatment vessel 5, it is possible to prevent excessive chemical strengthening from being carried out by the first treatment solution (chemical strengthening treatment solution).

There is a possibility that the first treatment solution (chemical strengthening treatment solution) adhering to the surfaces of the glass substrate 3 forms solid portions solidified due to rapid cooling and portions flowing still in the liquid form due to occurrence of so-called "liquid drip" on the surfaces of the glass substrate 3. However, in this invention, since the glass substrate 3 is brought into contact with the second treatment solution in the second treatment vessel 5 immediately after the first treatment vessel (chemical strengthening vessel) 4, excessive chemical strengthening due to the first treatment solution (chemical strengthening treatment solution) is prevented. Consequently, the distribution of compressive stress is maintained uniform at the surface layer portions of the glass substrate 3. As a result, the surface portions of the glass substrate 3 are maintained in the flat state.

Since the surface portions of the glass substrate 3 are maintained in the flat state, the flying height of a magnetic head is maintained well so that failures such as head crash are prevented with respect to a magnetic head formed by using this glass substrate 3. Further, also in the case of the glass substrate 3 reduced in thickness for mounting in a small-sized hard disk drive, the distribution of compressive stress at the surface layer portions is uniform. Consequently, occurrence of warping is prevented.

It is preferable that the bivalent ions contained in the second treatment solution capable of achieving such a second step be one of $Pb^{2+}$, $Cd^{2+}$, $Zn^{2+}$, $Hg^{2+}$, $Ca^{2+}$, $Sr^{2+}$, and $Ba^{2+}$.

Alternatively, as the second ions contained in the second treatment solution capable of achieving such a second step, use can be made of ions having an ionic radius equal to or smaller than that of ions contained in the glass substrate 3. For example, when the ions contained in the glass substrate 3 are lithium ions, lithium ions can be used as the second ions. On the other hand, when the ions contained in the glass substrate 3 are sodium ions, lithium ions or sodium ions can be used as the second ions.

After the second step, a step equivalent to the second step may be repeatedly carried out as a third step, a fourth step, . . . .

In these third and subsequent steps, the glass substrate 3 is brought into contact with third and subsequent treatment solutions by immersing the glass substrate 3 into the third and subsequent treatment solutions using third and subsequent treatment vessels, respectively. The third and subsequent treatment solutions contain third and subsequent ions, respectively. Like the second ions, the third and subsequent ions are bivalent ions. The third and subsequent ions may also be present in the first treatment solution (chemical strengthening treatment solution) in the first step. In this case, the ratios of the third and subsequent ions in the treatment solutions in the third and subsequent steps are set to be higher than those of the third and subsequent ions in the first treatment solution (chemical strengthening treatment solution) in the first step, respectively. Further, the time for which the glass substrate 3 is in contact with the first treatment solution (chemical strengthening treatment solution) in the first step is set to be longer than that for which the glass substrate 3 is in contact with the treatment solution in each of the third and subsequent steps.

Alternatively, like the second ions, the third and subsequent ions are ions having an ionic radius smaller than that of the first ions contained in the first treatment solution (chemical strengthening treatment solution). The third and subsequent ions may be ions having an ionic radius equal to that of the smallest alkali metal ions in the alkali metal ions contained in the glass substrate 3. Further, the third and subsequent ions may also be present in the first treatment solution (chemical strengthening treatment solution) in the first step. In this case, the ratios of the third and subsequent ions in the treatment solutions in the third and subsequent steps are set to be higher than those of the third and subsequent ions in the first treatment solution (chemical strengthening treatment solution) in the first step, respectively. Further, the time for which the glass substrate 3 is in contact with the first treatment solution (chemical strengthening treatment solution) in the first step is set to be longer than that for which the glass substrate 3 is in contact with the treatment solution in each of the third and subsequent steps.

Then, as shown in FIG. 1, the glass substrate 3 after the completion of the foregoing chemical strengthening process is formed into a product (magnetic-disk glass substrate) through cooling and cleaning processes and so on.

The magnetic-disk glass substrate according to this invention manufactured in the manner as described above is particularly suitable as a glass substrate for a thin magnetic disk having a disk thickness of less than 0.5 mm, particularly a disk thickness of 0.1 mm to 0.4 mm. Further, this magnetic-disk glass substrate is particularly suitable as a glass substrate for a small-sized magnetic disk having a disk diameter (outer diameter) of 30 mm or less. This is because such a thin, small-sized magnetic disk is mounted in a "1-inch hard disk drive" or in a hard disk drive smaller in size than the "1-inch hard disk drive". That is, this magnetic-disk glass substrate is suitable as a glass substrate for a magnetic disk adapted to be mounted in a "1-inch hard disk drive" or in a hard disk drive smaller in size than the "1-inch hard disk drive".

The diameter of a magnetic-disk glass substrate for manufacturing a magnetic disk adapted to be mounted in a "1-inch hard disk drive" is about 27.4 mm and the disk thickness thereof is 0.381 mm. On the other hand, the diameter of a magnetic-disk glass substrate for manufacturing a magnetic disk adapted to be mounted in a "0.85-inch hard disk drive" is about 21.6 mm.

[Surface Treatment Process Replacing Chemical Strengthening Process]

In the magnetic-disk glass substrate manufacturing method according to this invention, a surface treatment process comprising the following steps may be carried out instead of the chemical strengthening process comprising the two or more steps as described above.

Specifically, as a first step, the alkali metal ions contained in the glass substrate 3 are ion-exchanged for alkali metal ions having an ionic radius relatively larger than that of the alkali metal ions contained in the glass substrate 3. In this manner, the surfaces of the glass substrate are chemically strengthened.

This first step can be carried out by bringing the surfaces of the glass substrate 3 into contact with a first molten salt containing the alkali metal ions having the ionic radius relatively larger than that of the alkali metal ions contained in the glass substrate 3.

Then, as a second step, the surfaces of the glass substrate 3 are brought into contact with alkali metal ions equal to or relatively smaller than the smallest alkali metal ions contained in the glass substrate 3.

This second step can be carried out by adhering, to the surfaces of the glass substrate 3, a second molten salt containing, as a main component, the alkali metal ions equal to or relatively smaller than the smallest alkali metal ions contained in the glass substrate.

Then, the glass substrate 3 with the second molten salt adhering thereto is subjected to a cooling treatment. This cooling treatment preferably cools the glass substrate 3 to a temperature equal to or less than a freezing point of the second molten salt in an atmosphere. In this manner, by cooling the glass substrate 3 to the temperature equal to or less than the freezing point of the second molten salt in the atmosphere in the state where the second molten salt is adhering thereto, excessive chemical strengthening is suppressed.

[Film Formation of Magnetic Layer]

In a magnetic disk manufacturing method according to this invention, as a magnetic layer to be formed on the magnetic-disk glass substrate manufactured in the manner as described above, it is possible to use a layer made of, for example, a cobalt (Co)-based ferromagnetic material. Particularly, it is preferable to form the layer as a magnetic layer made of a cobalt-platinum (Co—Pt)-based ferromagnetic material or a cobalt-chromium (Co—Cr)-based ferromagnetic material capable of obtaining a high coercive force. As a method of forming the magnetic layer, a DC magnetron sputtering method can be used.

Further, it is preferable that an underlayer and so on be suitably interposed between the glass substrate and the magnetic layer. As materials of the underlayer, use can be made of an Al—Ru-based alloy, a Cr-based alloy, and so on.

Further, on the magnetic layer, it is possible to provide a protective layer for protecting a magnetic disk from an impact by a magnetic head. As this protective layer, a hard hydrogenated carbon protective layer can be preferably used.

Further, by forming a lubricating layer made of a PFPE (perfluoropolyether) compound on the protective layer, it is possible to relax interference between the magnetic head and the magnetic disk. This lubricating layer can be formed, for example, by coating/film formation using a dipping method.

Example

Hereinbelow, a description will be given in detail by citing Examples and Comparative Example. This invention is not to be limited to the structures of the Examples.

[Example of Magnetic-Disk Glass Substrate Manufacturing Method]

A magnetic-disk glass substrate manufacturing method in this Example described hereinbelow comprises the following processes (1) to (9).

(1) Rough Lapping Process (Rough Grinding Process)
(2) Shaping Process
(3) Precision Lapping Process (Precision Grinding Process)
(4) End Face Mirror Finishing (Polishing) Process
(5) First Abrasion (Polishing) Process
(6) Second Abrasion (Polishing) Process
(7) Chemical Strengthening Process (First Step)
(8) Chemical Strengthening Process (Second Step)
(9) Cleaning Process At first, there was prepared a disk-shaped glass base member made of amorphous aluminosilicate glass. This aluminosilicate glass contains lithium. The composition of this aluminosilicate glass contains 63.6 wt % $SiO_2$, 14.2 wt % $Al_2O_3$, 10.4 wt % $Na_2O$, 5.4 wt % $Li_2O$, 6.0 wt % $ZnO_2$, and 0.4 wt % $Sb_2O_3$.

(1) Rough Lapping Process

Using, as a glass base member, a sheet glass with a thickness of 0.6 mm formed from molten aluminosilicate glass, a disk-shaped glass substrate having a diameter of 28.7 mm and a thickness of 0.6 mm is obtained from the sheet glass using a grindstone.

The aluminosilicate glass being the material of the sheet glass is required to contain 58 to 75 wt % $SiO_2$, 5 to 23 wt % $Al_2O_3$, 4 to 13 wt % $Na_2O$, and 3 to 10 wt % $Li_2O$.

Then, a lapping process is applied to the glass substrate for improving its size accuracy and shape accuracy. This lapping process is carried out using a double-side lapping machine and abrasive grains of grain size #400.

Specifically, at first, using alumina abrasive grains of grain size #400, setting a load to about 100 kg, and rotating a sun gear and an internal gear, both surfaces of the glass substrate placed in a carrier are lapped to a profile irregularity of 0 to 1 μm and a surface roughness (Rmax) of about 6 μm.

(2) Shaping Process

Then, using a cylindrical grindstone, a hole having a diameter of 6.1 mm is formed at a center portion of the glass substrate and grinding is applied to an outer peripheral end face to obtain a diameter of 27.43 mm, and then, predetermined chamfering is applied to the outer peripheral end face and an inner peripheral end face. In this event, the surface roughness of the end faces of the glass substrate is set to about 4 μm in Rmax.

(3) Precision Lapping Process

Then, the grain size of the abrasive grains is changed to #1000 and the main surfaces of the glass substrate are lapped, thereby obtaining a surface roughness of about 2 μm in Rmax and about 0.2 μm in arithmetic average roughness (Ra).

By carrying out this precision lapping process, fine concave-convex shapes formed on the main surfaces in the preceding rough lapping process and shaping process are reduced.

The glass substrate subjected to such a precision lapping process is immersed in respective cleaning baths, applied with ultrasonic wave, of neutral detergent and water in turn, thereby carrying out ultrasonic cleaning.

(4) End Face Mirror Finishing (Polishing) Process

Then, the end faces (inner peripheral end face and outer peripheral end face) of the glass substrate are polished to a surface roughness of about 40 nm in arithmetic average roughness (Ra) by brush polishing while rotating the glass substrate.

Then, the main surfaces of the glass substrate subjected to the end face mirror finishing are rinsed with water.

In this end face mirror finishing (polishing) process, end faces are polished by placing glass substrates in layers. In order to prevent occurrence of cracks or the like on the main surfaces of the glass substrates in this event, it is preferable to carry out this process before a later-described first abrasion (polishing) process or before or after a later-described second abrasion (polishing) process.

By this end face mirror finishing (polishing) process, the end faces of the glass substrate are finished to a mirror surface state that can prevent generation of dust such as particles.

(5) First Abrasion (Polishing) Process

Then, in order to remove cracks and distortion remaining in the foregoing precision lapping process, the first abrasion (polishing) process is carried out using a double-side polishing machine.

The first abrasion (polishing) process is carried out using polyurethane foam as polishing pads. The polishing condition is such that use is made of a polishing solution containing cerium oxide and RO water. The glass substrate having been subjected to the first abrasion (polishing) process is immersed in respective cleaning baths of neutral detergent, pure water (1), pure water (2), IPA (isopropyl alcohol), and IPA (steam drying) in turn so as to be subjected to ultrasonic cleaning and drying.

(6) Second Abrasion (Polishing) Process

Then, the second abrasion (polishing) process is carried out, as a main surface mirror polishing process, using a double-side polishing machine which is the same as that used in the first polishing process, while the polishers are changed to soft polishing pads (polyurethane foam).

The second abrasion (polishing) process is for the purpose of reliably removing the cracks while maintaining the flat main surfaces obtained by the foregoing first abrasion (polishing) process, thereby forming mirror surfaces in which the surface roughness of the main surfaces is reduced, for example, to about 0.4 to 0.1 nm in arithmetic average roughness (Ra).

As a polishing solution, use is made of a polishing solution containing colloidal silica polishing abrasive grains (average grain size 80 nm) and RO water. A load is set to 100 g/cm$^2$ and a polishing time is set to 5 minutes.

The glass substrate subjected to the second polishing process is immersed in respective cleaning baths of neutral detergent, pure water (1), pure water (2), IPA (isopropyl alcohol), and IPA (steam drying) in turn so as to be subjected to ultrasonic cleaning and drying.

(7) Chemical Strengthening Process (First Step)

Then, a chemical strengthening treatment is applied to the glass substrate subjected to the cleaning. In the chemical strengthening treatment, a first step is carried out using, as a first treatment solution (chemical strengthening treatment solution), a molten chemical strengthening salt obtained by melting a chemical strengthening salt in the form of a mixture of potassium nitrate, sodium nitrate, and lithium nitrate.

This first treatment solution (chemical strengthening treatment solution) is heated to 340° C. to 380° C. and the glass substrate subjected to the cleaning and drying is immersed in a first treatment vessel (chemical strengthening vessel) 4 for about 2 to 4 hours, thereby carrying out the chemical strengthening treatment. In order to chemically strengthen the entire magnetic-disk glass substrate surfaces, the immersion is carried out in the state where the magnetic-disk glass substrates are placed in a holder so as to be retained at their end faces.

(8-1) Chemical Strengthening Process (Second Step) (First Example)

Then, a second step of the chemical strengthening process is applied to the glass substrate subjected to the first step of the chemical strengthening process. The second step of the chemical strengthening treatment is carried out using, as a second treatment solution, a treatment solution containing $Pb^{2+}$, $Cd^{2+}$, $Zn^{2+}$, $Hg^{2+}$, $Ca^{2+}$, $Sr^{2+}$, or $Ba^{2+}$ as bivalent ions being second ions.

This second treatment solution is heated to 340° C. to 380° C. in a second treatment vessel and the glass substrate subjected to the first step and removed from the first treatment vessel (chemical strengthening vessel) 4 is immediately immersed into the second treatment solution in the second treatment vessel.

(8-2) Chemical Strengthening Process (Second Step) (Second Example)

Then, a second step of the chemical strengthening process is applied to the glass substrate subjected to the first step of the chemical strengthening process. The second step of the chemical strengthening treatment is carried out using, as a second treatment solution, a molten chemical strengthening salt with a high concentration of lithium ions obtained by melting lithium nitrate.

This second treatment solution is heated to 340° C. to 380° C. in a second treatment vessel and the glass substrate subjected to the first step and removed from the first treatment vessel (chemical strengthening vessel) 4 is immediately immersed into the second treatment solution in the second treatment vessel.

(9) Cleaning Process

The magnetic-disk glass substrate subjected to the chemical strengthening process is immersed in a water bath at 20° C. so as to be rapidly cooled, and maintained for about 10 minutes.

The magnetic-disk glass substrate subjected to the rapid cooling is immersed in concentrated sulfuric acid heated to about 40° C. so as to be cleaned. Further, the magnetic-disk glass substrate subjected to the sulfuric acid cleaning is immersed in respective cleaning baths of pure water (1), pure water (2), IPA (isopropyl alcohol), and IPA (steam drying) in turn so as to be subjected to ultrasonic cleaning and drying.

Then, with respect to the main surfaces of the magnetic-disk glass substrate subjected to the cleaning, a visual inspection is carried out and, further, a close inspection using reflection, scattering, and transmission of light is carried out.

It was confirmed that fine waviness of the main surfaces of the magnetic-disk glass substrate obtained through the foregoing processes was 2.5 nm, thus achieving ultra-flat mirror surfaces. This maximum value of the fine waviness is a maximum value when measuring waviness of frequencies with wavelengths of 4 μm to 1 mm by the non-contact laser interference method using "MicroXAM" manufactured by Phase Shift Technology, Inc. The measurement range is within a rectangle (800 μm×980 μm) having sides of 800 μm and 980 μm.

The main surfaces of the obtained magnetic-disk glass substrate were closely analyzed by using an electron microscope and confirmed to be excellent mirror surfaces with no cracks, convex portions (fine waviness), or the like. Using the colloidal silica polishing abrasive grains (average grain size 80 nm) to carry out the mirror polishing of the main surfaces, it was possible to achieve the smooth mirror surfaces with 0.30 nm in Ra.

With the main surfaces formed into the mirror surfaces with about 0.1 nm to 0.4 nm in Ra and with the cracks removed, it is possible to more reliably prevent delayed fracture of the chemically strengthened glass.

Further, foreign matter or particles that would cause thermal asperity were not observed on the surfaces of the magnetic-disk glass substrate and foreign matter or cracks were not observed also on the inner peripheral side end face of the circular hole.

[Example of Magnetic Disk Manufacturing Method]

Then, a magnetic disk was manufactured through the following processes.

On each of both main surfaces of the magnetic-disk glass substrate obtained through the foregoing processes, an Al—Ru alloy seed layer, a Cr—W alloy underlayer, a Co—Cr—Pt—Ta alloy magnetic layer, and a hydrogenated carbon protective layer are formed in turn by using a stationary opposing-type DC magnetron sputtering apparatus. The seed layer serves to reduce the size of magnetic grains of the magnetic layer and the underlayer serves to orient the easy magnetization axis of the magnetic layer in the in-plane direction.

This magnetic disk comprises at least a magnetic-disk glass substrate being a nonmagnetic substrate, a magnetic layer formed on the magnetic-disk glass substrate, a protective layer formed on the magnetic layer, and a lubricating layer formed on the protective layer.

A nonmagnetic metal layer (nonmagnetic underlayer) composed of a seed layer and an underlayer is formed between the magnetic-disk glass substrate and the magnetic layer. In this magnetic disk, all the layers except the magnetic layer are each made of a nonmagnetic substance. In this Example, the magnetic layer and the protective layer are formed in contact with each other and the protective layer and the lubricating layer are formed in contact with each other.

Specifically, at first, using an Al—Ru (aluminum-ruthenium) alloy (Al:50 at %, Ru:50 at %) as a sputtering target, the seed layer made of the Al—Ru alloy and having a thickness of 30 nm is formed on the magnetic-disk glass substrate by sputtering. Then, using a Cr—W (chromium-tungsten) alloy (Cr:80 at %, W:20 at %) as a sputtering target, the underlayer made of the Cr—W alloy and having a thickness of 20 nm is formed on the seed layer 5 by sputtering. Then, using a Co—Cr—Pt—Ta (cobalt-chromium-platinum-tantalum) alloy (Cr:20 at %, Pt:12 at %, Ta:5 at %, Co:balance) as a sputtering target, the magnetic layer made of the Co—Cr—Pt—Ta alloy and having a thickness of 15 nm is formed on the underlayer by sputtering.

Then, the protective layer made of hydrogenated carbon is formed on the magnetic layer and, further, the lubricating layer made of PFPE (perfluoropolyether) is formed by the dipping method. The protective layer serves to protect the magnetic layer from an impact by a magnetic head.

Using the magnetic disk thus obtained, a glide inspection was performed by the use of a glide head with a flying height of 10 nm. Then, no colliding foreign matter or the like was detected and it was possible to maintain a stable flying state. Further, a recording/reproducing test was performed at 700 kFCI using this magnetic disk and it was possible to obtain a sufficient signal intensity ratio (S/N ratio). No signal errors were observed.

Further, the magnetic disk was mounted in a "1-inch hard disk drive" requiring an information recording density of 60 gigabits per inch$^2$ or more and was driven and it was possible to perform recording and reproduction with no particular problem. That is, no crash failure or thermal asperity failure occurred.

In this invention, the diameter (size) of a magnetic-disk glass substrate is not particularly limited. However, this invention exhibits excellent usefulness particularly in the case of manufacturing a small-diameter magnetic-disk glass substrate. Herein, the small-diameter magnetic-disk glass substrate represents, for example, a magnetic-disk glass substrate having a diameter of 30 mm or less.

Specifically, this is because, for example, a small-diameter magnetic disk having a diameter of 30 mm or less is used in a storage of an on-vehicle device such as a so-called car navigation system or of a portable device such as a so-called PDA or portable telephone terminal device and thus is required to have high durability and high impact resistance as compared with a normal magnetic disk in a device that is used in a fixed state.

INDUSTRIAL APPLICABILITY

This invention is used in the manufacture of a magnetic-disk glass substrate that forms a magnetic disk for use in a hard disk drive (HDD) or the like being a magnetic disk device.

Further, this invention is employed in the manufacture of a magnetic disk using such a magnetic-disk glass substrate.

The invention claimed is:

1. A method of manufacturing a magnetic-disk glass substrate, the method including a chemical strengthening process of chemically strengthening the glass substrate, wherein:
the chemical strengthening process comprises at least two steps;
a first step brings the glass substrate into contact with a chemical strengthening treatment solution containing first ions having an ionic radius larger than an ionic radius of ions contained in the glass substrate, thereby causing ion exchange to occur; and
a second or subsequent step brings the glass substrate into contact with a treatment solution containing second or subsequent ions being bivalent ions, wherein the second or subsequent step of bringing the glass substrate into contact with the treatment solution containing second or subsequent ions being bivalent ions is carried out to suppress excessive chemical strengthening due to the treatment solution adhering to a surface portion of the glass substrate after the first step and to prevent formation of fine waviness on the glass substrate, wherein a maximum value of the fine waviness of a main surface of the glass substrate is less than 5 nm in a rectangular measurement range having sides of 800 um and 980 um.

2. The method of manufacturing the magnetic-disk glass substrate according to claim 1, wherein:
the second or subsequent ions are any one of $Pb^{2+}$, $Cd^{2+}$, $Zn^{2+}$, $Hg^{2+}$, $Ca^{2+}$, $Sr^{2+}$, and $Ba^{2+}$.

3. A method of manufacturing a magnetic-disk glass substrate, the method including a chemical strengthening process of chemically strengthening the glass substrate, wherein:
the chemical strengthening process comprises at least two steps;
a first step of bringing the glass substrate into contact with a chemical strengthening treatment solution brings the glass substrate into contact with the chemical strengthening treatment solution containing first ions having an ionic radius larger than an ionic radius of alkali metal ions contained in the glass substrate, thereby causing ion exchange to occur; and
a second or subsequent step brings the glass substrate into contact with a treatment solution containing second or subsequent ions having an ionic radius smaller than the ionic radius of the first ions,
wherein each of the chemical strengthening treatment solution and the treatment solution is a molten salt,
the ion exchange is carried out by using a low-temperature ion exchange method that performs the ion exchange in a temperature range not exceeding a glass annealing point, and
the low-temperature ion exchange method replaces the alkali metal ions contained in the glass substrate by the first ions to produce a compressive stress in a surface layer of the glass substrate by an increase in volume of an ion exchange portion,
wherein the glass substrate subjected to the first step and removed from the chemical strengthening treatment solution is immediately immersed into the treatment solution to suppress excessive chemical strengthening due to the chemical strengthening treatment solution adhering to a surface portion of the glass substrate after the first step and to prevent formation of fine waviness on the glass substrate,
wherein a maximum value of the fine waviness of a main surface of the glass substrate is less than 5 nm in a rectangular measurement range having sides of 800 μm and 980 μm.

4. A method of manufacturing of a magnetic-disk glass substrate, the method including a chemical strengthening process of chemically strengthening the glass substrate, wherein:
the chemical strengthening process comprises at least two steps;
a first step of bringing the glass substrate into contact with a chemical strengthening treatment solution brings the glass substrate into contact with the chemical strengthening treatment solution containing first ions having an ionic radius larger than an ionic radius of ions contained in the glass substrate, thereby causing ion exchange to occur; and
the second or subsequent step brings the glass substrate into contact with a treatment solution containing second or subsequent ions having an ionic radius equal to an ionic radius of smallest alkali metal ions in alkali metal ions contained in the glass substrate, wherein each of the chemical strengthening treatment solution and the treatment solution is a molten salt, the ion exchange is carried out by using a low-temperature ion exchange method that performs the ion exchange in a temperature range not exceeding a glass annealing point, and the low-temperature ion exchange method replaces the ions contained in the glass substrate by the first ions to produce a compressive stress in a surface layer of the glass substrate by an increase in volume of an ion exchange portion, wherein the glass substrate subjected to the first step and removed from the chemical strengthening treatment solution is immediately immersed into the treatment solution to suppress excessive chemical strengthening due to the chemical strengthening treatment solution adhering to a surface portion of the glass substrate after the first step and to prevent formation of fine waviness on the glass substrate, wherein a maximum value of the fine waviness of a main surface of the glass substrate is less than 5 nm in a rectangular measurement range having sides of 800 μm and 980 μm.

5. The method of manufacturing the magnetic-disk glass substrate according to claim 3 or 4, wherein:

the second or subsequent ions are present in the chemical strengthening treatment solution in the first step; and a concentration of the second or subsequent ions in the treatment solution in the second or subsequent step is higher than a concentration of the second or subsequent ions in the chemical strengthening treatment solution in the first step.

6. The method of manufacturing of the magnetic-disk glass substrate according to claim 3 or 4, wherein:

a time for which the glass substrate is in contact with the chemical strengthening treatment solution in the first step is longer than a time for which the glass substrate is in contact with the treatment solution in the second or subsequent step.

7. A method of manufacturing a magnetic-disk glass substrate containing an alkali metal element, the method including a step of treating a surface of the glass substrate, comprising:

ion-exchanging first alkali metal ions contained in the glass substrate for second alkali metal ions having an ionic radius relatively larger than an ionic radius of the first alkali metal ions contained in the glass substrate, thereby chemically strengthening the surface of the glass substrate; and thereafter bringing the surface of the glass substrate into contact with third alkali metal ions equal to or relatively smaller than a smallest alkali metal ions contained in the glass substrate, wherein the ion-exchanging is carried out by using a low-temperature ion exchange method that performs the ion-exchanging in a temperature range not exceeding a glass annealing point, and the low-temperature ion exchange method replaces the first alkali metal ions by the second alkali metal ions to produce a compressive stress in a surface layer of the glass substrate by an increase in volume of an ion exchange portion, wherein the bringing the surface of the glass substrate into contact with the third alkali metal ions is carried out to suppress excessive chemical strengthening for the surface of the glass substrate and to prevent formation of fine waviness on the glass substrate, wherein a maximum value of the fine waviness of a main surface of the glass substrate is less than 5 nm in a rectangular measurement range having sides of 800 μm and 980 μm.

8. A method of manufacturing a magnetic-disk glass substrate containing an alkali metal element, the method including a step of treating a surface of the glass substrate, comprising:

bringing the surface of the glass substrate into contact with a first molten salt containing first alkali metal ions having an ionic radius relatively larger an ionic radius of second alkali metal ions contained in the glass substrate, thereby chemically strengthening the surface of the glass substrate;

thereafter adhering, to the surface of the glass substrate, a second molten salt containing, as a main component, third alkali metal ions equal to or relatively smaller than smallest alkali metal ions contained in the glass substrate, and cooling the glass substrate on which the second molten is adhered, wherein ion exchange in the chemically strengthening is carried out by using a low-temperature ion exchange method that performs the ion exchange in a temperature range not exceeding a glass annealing point, and the low-temperature ion exchange method replaces the second alkali metal ions contained in the glass substrate by first alkali metal ions to produce a compressive stress in a surface layer of the glass substrate by an increase in volume of an ion exchange portion, wherein the adhering the second molten salt to the surface of the glass substrate is carried out to suppress excessive chemical strengthening for the surface of the glass substrate and to prevent formation of fine waviness on the glass substrate, wherein a maximum value of the fine waviness of a main surface of the glass substrate is less than 5 nm in a rectangular measurement range having sides of 800 μm and 980 μm.

9. The method of manufacturing the magnetic-disk glass substrate according to claim 8, comprising:

cooling the glass substrate to a temperature equal to or less than a freezing point of the second molten salt in an atmosphere.

10. A method of manufacturing a magnetic disk, comprising:

forming at least a magnetic layer on the magnetic-disk glass substrate manufactured by the magnetic-disk glass substrate manufacturing method according to any one of claims 3, 4, 7, or 8.

11. The method of manufacturing the magnetic-disk glass substrate according to claim 3 or 4, wherein the bringing the glass substrate into contact with the chemical strengthening treatment solution and the treatment solution in the first step and the second or subsequent step is carried out by immersing the glass substrate into the chemical strengthening treatment solution and the treatment solution, respectively.

* * * * *